US010773611B2

(12) United States Patent
Schlosser et al.

(10) Patent No.: US 10,773,611 B2
(45) Date of Patent: Sep. 15, 2020

(54) DECENTRALIZED SEAT CONTROL SYSTEM

(71) Applicant: Bühler Motor GmbH, Nuremberg (DE)

(72) Inventors: Stefan Schlosser, Forchheim (DE); Stefan Gröllich, Uhldingen-Mühlhofen (DE)

(73) Assignee: BÜHLER MOTOR GMBH, Nuremberg (DE)

( * ) Notice: Subject to any disclaimer, the term of this patent is extended or adjusted under 35 U.S.C. 154(b) by 263 days.

(21) Appl. No.: 15/857,049

(22) Filed: Dec. 28, 2017

(65) Prior Publication Data
US 2018/0118055 A1 May 3, 2018

Related U.S. Application Data

(63) Continuation of application No. PCT/DE2016/200297, filed on Jun. 28, 2016.

(30) Foreign Application Priority Data

Jul. 3, 2015 (DE) .................. 10 2015 212 516

(51) Int. Cl.
*B60N 2/02* (2006.01)
*B64D 11/06* (2006.01)
*B64D 11/00* (2006.01)

(52) U.S. Cl.
CPC ......... *B60N 2/0252* (2013.01); *B60N 2/0228* (2013.01); *B60N 2/0232* (2013.01);
(Continued)

(58) Field of Classification Search
None
See application file for complete search history.

(56) References Cited

U.S. PATENT DOCUMENTS

2007/0216204 A1 9/2007 Schweizer
2011/0238256 A1 9/2011 Heeg et al.
(Continued)

FOREIGN PATENT DOCUMENTS

DE 10 2004 047 149 A1 4/2006
DE 10 2008 062 092 B3 12/2009
(Continued)

OTHER PUBLICATIONS

International Search Report dated Jun. 28, 2016, issued in counterpart International Application No. PCT/DE2016/200297 (3 pages).

*Primary Examiner* — Lail A Kleinman
(74) *Attorney, Agent, or Firm* — Westerman, Hattori, Daniels & Adrian, LLP

(57) ABSTRACT

A decentralized seat control system for seats, each seat having several linearly or angularly movable seat elements. The control system includes a serial data bus; a power supply; smart devices with drives connected to the serial data bus and the power supply, each smart device having a basic function and selectably functioning as an active system master; non-smart devices lacking a control function; a smart control device for controlling the non-smart devices; and a program control unit, wherein the active system master provides control commands to the other smart devices.

39 Claims, 13 Drawing Sheets

(52) U.S. Cl.
CPC ........ *B60N 2/0244* (2013.01); *B64D 11/0639* (2014.12); *B60N 2002/0264* (2013.01); *B60N 2002/0272* (2013.01); *B64D 11/0015* (2013.01); *B64D 2011/0053* (2013.01)

(56) References Cited

U.S. PATENT DOCUMENTS

2014/0172242 A1    6/2014  Fruhwald et al.
2016/0096626 A1*   4/2016  Hoch ................. B64D 11/0643
                                                            244/118.6

FOREIGN PATENT DOCUMENTS

| | | |
|---|---|---|
| DE | 10 2012 024 641 A1 | 6/2014 |
| EP | 1 432 593 B1 | 5/2006 |
| EP | 1 834 876 A2 | 9/2007 |

* cited by examiner

DECENTRALIZED SEAT CONTROL SYSTEM

CROSS-REFERENCE TO RELATED APPLICATIONS

The present patent application is a continuation of International Application No. PCT/DE2016/200297, filed Jun. 28, 2016, which is based on, and claims priority from, German Application No. 10 2015 212 516.5, filed Jul. 3, 2015, both of which are incorporated herein by reference in their entireties.

BACKGROUND OF THE INVENTION

(1) Field of the Invention

The invention relates to a decentralized seat control system for seats with several, relative to one another, linearly or angularly movable seat elements.

(2) Description of Related Art Including Information Disclosed Under 37 CFR 1.97 and 1.98

Vehicle seats, in particular, aircraft seats of the premium class, usually have a number of movable seating elements such as backrest, neck support, leg rest, footrest, etc., which by means of for instance, electric motor drives are adjustable, linearly or at an angle. Furthermore, pneumatic cushions operated via pumps and valves may be present as lumbar support, e.g., with massage functions, operating devices, reading lamps, entertainment functions, and safety devices such as locking locks. The different drives and other functions can be referred to simply as devices, which are connected to each other via a control system. A control system triggers the individual functions, and monitors and coordinates them.

EP 1 432 593 BI describes a control and energy supply system for the drives used in aircraft seats. In order to ensure a reliable function, a redundant design of the system is proposed, in which each drive can be supplied by two power supplies, and the system has a central control unit which controls the drives, wherein the individual devices are interconnected by a data line device. In addition, in the event of failure, the function of the central control unit is to be taken over by a drive equipped with software. In a further development several or all drives shall assume the function of the central control unit through their distributed intelligence. This solution is not economical, due to the large number of individual devices, and leads to increased fuel consumption due to the weight of these devices.

DE 10 2004 047 149 describes a control system for complex systems, in particular, for an aircraft seat, with components such as drives, pumps, valves, lamps, etc., which each have at least one processor with an interface for communication, as well as a functional block, and communicate with each other as a bus participant through a bus system, wherein, instead of a central control unit, several bus participants each take over parts of the control tasks. Although this can be dispensed with due to the distributed control tasks on a central control, even simple devices, e.g., a lamp, must be equipped with a processor to be controllable.

BRIEF SUMMARY OF THE INVENTION

The aim of the invention is to present a flexible seat control system which is adaptable to different circumstances—in particular, different seat geometries and different system environments and system requirements—which works extremely reliably, is easy to maintain, has a simple structure and wiring, and which requires only a minimal number of different devices, which can be combined with each other in the widest variety of ways.

Since one of the smart devices, in addition to its basic function, additionally has the function of a system master, from which other smart devices receive control commands, a reliable function of the seat control is given, without a central control being necessarily provided. Devices are referred to as smart if they have a computing and a storage unit, and can communicate with other smart devices via a BUS interface. The invention enables a very flexible seat control system, in which a minimum number of differently designed devices can fulfill a maximum of functions.

The individual devices have basic functions. Control devices are also referred to as a "Passenger Control Unit," or "PCU" for short; in the present example, the PCU consists of a touch screen with menu guidance and allows individual control of the seat elements it is associated with; its basic function is an "operating function."

The smart interface device is also referred to as a "seat interface device" or "SID" for short; it serves as a service interface, data collector, etc.; its basic function is a "service function."

The smart control device for non-smart devices or devices without control function is also referred to as "discrete line controller," or "DLC for short;" its basic function is the control of non-bus-compatible accessory devices such as a reading light, mood lighting, external control unit, locks, and other external devices.

The power supply serves as an interface to the electrical system, with transformation of the on-board electrical system voltage to, for example, 28 V. The power supply unit has several (e.g., four) DC outputs, or so-called "ports," and serves as a central power supply for a group of seats and/or other devices; its basic function is the distribution of on-board voltage and the provision of identification information or "ID" for short.

"Master function" means that a smart device has only the function of a system master, but does not exclusively serve as a system master. The smart device also has a basic function.

A particularly advantageous embodiment of the invention is based upon the fact that the tasks of a system master are distributed over several smart devices, wherein each smart device has a subtask or subtasks of a subsystem master in addition to its basic function.

Furthermore, it makes sense that the subsystem masters form subgroups, in relation to the overall functionality. A first subsystem master could be responsible for the motion coordination of the drives of a first seat, and a second subsystem master for the motion coordination of the drives of a second seat. A further subsystem master could control the remaining functions. This makes it easier to program the various functions. It is expediently provided that smart devices with a system master function or subsystem master function receive status information from the remaining smart devices.

According to one further development of the invention, it is provided that one of the smart devices controls the remaining devices of a seat or several seats and has the task of motion coordination of the seat elements of the seat or seats.

Likewise, one of the devices can control a portion of the drives of one seat or several seats, another device controls another portion of a seat or several seats, and the respective device has the task of motion coordination of the partial seating elements of the seat or seats.

For economic and practical reasons, not every device which performs an additional auxiliary function on a seat has a smart control with a BUS interface. For this reason, it is of great advantage that a smart control device controls several non-bus-compatible peripheral devices for environmental functions. These accessory devices include, for example, a reading light, mood lighting, custom lighting, a monitor, locks, external sensors for environmental sensing, and/or an external control panel.

Seat control systems usually have a power supply, which forms an interface to an on-board electrical system and converts voltage to, for example, 28 V. The power supply can have one or more DC outputs, or "ports." In the present embodiment, the power supply has four ports to which either a total of four seats or, e.g., two seats and other accessory devices such as partitions or monitor drives can be connected.

In a particularly economical further development of the invention, it is provided that the different ports contain an identifier in the form of different control voltages, which represents a recognition feature for the respectively connected devices.

The fewer different devices that are required in the seat control system, the lower the cost of manufacture and storage. It is therefore preferred that several seats be connected to the communications bus with identical devices, and a distinction be feasible through the different control voltages.

The seat control system is constructed so flexibly that, in addition to seats, other means to be controlled can also be integrated. Here, four groups are available, which consist of seats, partitions, or other devices, e.g., a monitor adjustment device, for which a minimum number of different drives is provided, whose number is smaller than the absolute number of drives. As an alternative to a differentiated voltage level, each seat or function group has a digital or analog identifier, and the power supply has a splitter function by means of which several (e.g., up to four) seats or devices can be controlled. The splitter function can also be integrated into a separate or another device of the seat control system.

In order to be able to install or service the seat control system in a particularly simple manner, a smart interface device is provided, which serves as a service interface via which software and/or parameter sets can be uploaded to all smart devices. Incidentally, the smart interface device/SID can be used for collecting and storing system data. A further function of the SID includes the configuration management of the drive system.

Due to different geometric conditions in different applications, a variety of different configurations may arise. In this case, it is particularly advantageous that the selection of the devices with system or subsystem master function can be defined by a parameter set in all smart devices.

The seat control system is particularly reliable due to the reduction in the components involved. To further increase reliability, if one smart device fails, another smart device takes over its function or sub function. The transfer is, in the process, also regulated by the parameter set.

In order to achieve the most economical and simple wiring of the devices with each other, and a minimum weight, the individual smart devices are interconnected by the daisy chain principle, although a star-shaped version would also be possible. This means that both the power supply lines and the data lines have an input and an output in the respective device.

An essential feature of the invention is a hybrid structure of the seat control system, wherein the control module in each device controls the device on the basis of status information from the communications bus, and further system tasks are executed on the basis of control commands of the active system master or the active system masters. The active system master(s) receive the status of the other smart devices of the system and send(s) commands back to the devices.

According to a particularly advantageous further development of the invention, it is provided that, in case of failure, a system master takes over the role of another device. In this way, it is expediently provided that, in case of failure of the active system master, the smart device is selected according to a pre-installed priority list, and takes over the function of the active system master.

In order to provide sufficient storage space for a comprehensive database, a smart device, preferably, the SID, is equipped with an electronic memory of sufficient size, e.g., greater than 1 GB. Thus, statistically relevant amounts of data can be stored during runtime or operation; these are evaluated automatically, and, therefore, failures are detected and reported early.

To assign an event to an exact time, the system has a real-time clock, whose power is supplied via an energy storage device, e.g., a super capacitor. This has the advantage that, in the case of a capacitor, no battery is required, and the real-time clock is thus maintenance-free.

The validity of the log data is further increased by the fact that these are assigned to the cabin interior pressure. This is indirectly a measure of the flight altitude or the takeoff or landing status.

According to a further aspect of the invention, it is provided that the drives have an integrated motion control, which has interfaces to a drive, e.g., an electric motor, to a position feedback, e.g., to a potentiometer, to a temperature sensor, to a brake, and to the communications bus. The integrated motion control also includes an anti-trap function, which includes a di/dt monitoring, according to which the emergence of a trap situation is detected by an increased current value and prevented in time. Alternatively, or additionally, an anti-trap function can be present in a kinematically- and position-dependent fashion.

In order to increase the comfort for the seat user, a load-independent speed control is implemented, which ensures a smooth, even run for both a low and a high weight of the respective user. In the case of using an electric drive, the quiet and calm operation of the drive motors is ensured by a power-optimized commutation.

Closed-loop control allows the motor speed to be controlled up to a rotational speed of 0. The closed loop control also takes place up to the maximum required rotational speed of the respective drive.

According to a further development of the invention, it is provided that the system master controls all subordinate drives in such a way that, during simultaneous activation of several drives as a group via the communications bus, the activation and deactivation of the brakes takes place in a noise- and power-optimized manner.

A particularly low-noise control function is given by the fact that, if, in case of deactivated brakes, individual drives reach their end point of movement before other drives that are subordinate to the system master, the drive control provides for a counter-control by means of a position control in the case of a force application of these drives, until, upon reaching the end point of movement by the last drive, the brakes for all affected drives are activated again. The communications bus is, for example, a low-speed CAN BUS with 125 kBit/s.

In a particularly space-saving variant of the invention, the smart control device and the smart interface device are integrated in a common housing. As a result, plug components and connection cables can be saved. It is also possible to arrange electronic components of the control unit and of the interface device on a single circuit board. As a result, further components can be saved and/or shared.

BRIEF DESCRIPTION OF THE SEVERAL VIEWS OF THE DRAWINGS

The invention is better understood by reading the following Detailed Description of the Preferred Embodiments with reference to the accompanying drawing figures, in which like reference numerals refer to like elements throughout, and in which.

DETAILED DESCRIPTION OF THE INVENTION

Figure 1:
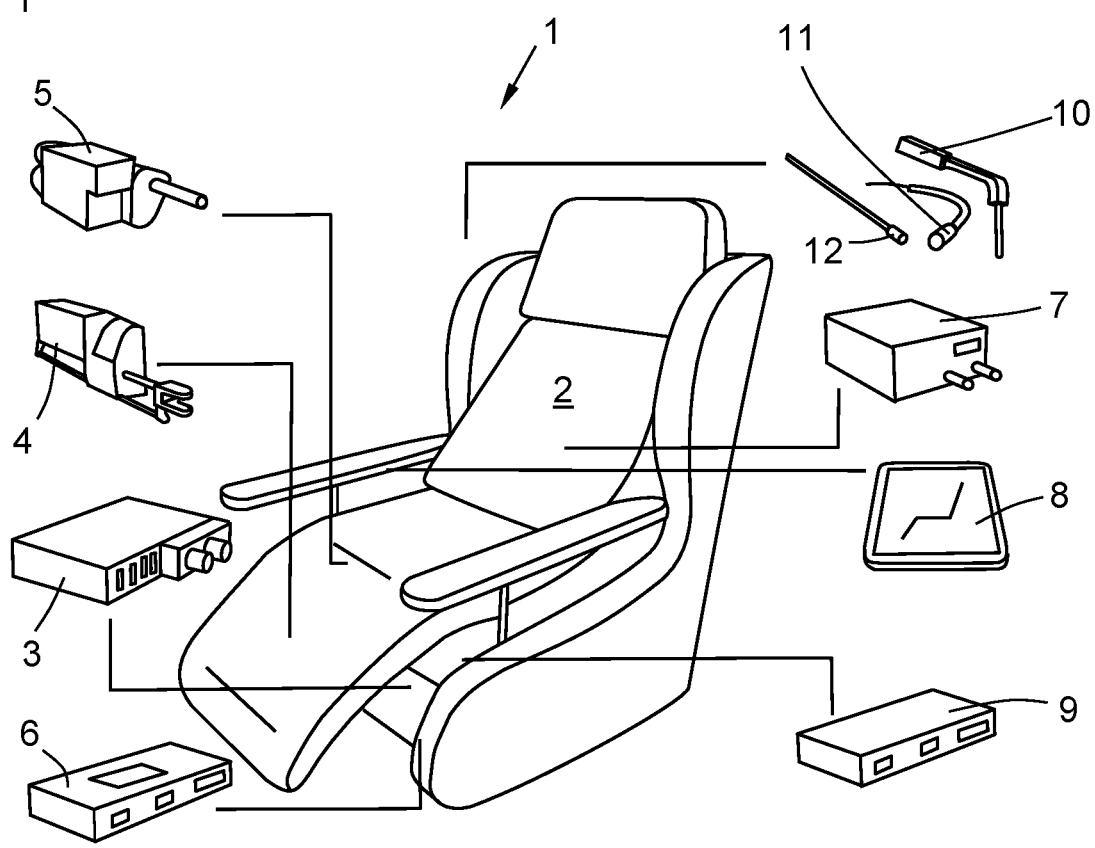
FIG. 1 shows a perspective view of a seat with stylized indicated accessory devices.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

FIG. 1 shows a seat 2 having a plurality of devices of a seat control system 1. For the sake of clarity, these devices are shown stylized arranged around the seat 2, with an indication of their location in the seat 2. In detail, the illustrated devices are a rotary actuator also known as a pivot drive 5, a linear actuator also known as a linear drive 4, a power supply 3, a smart interface device (SID) 6, a smart control device (DLC) 9, a program control unit 8, a lumbar drive 7, a reading light 10, mood lighting 11, and custom lighting 12.

Figure 2:
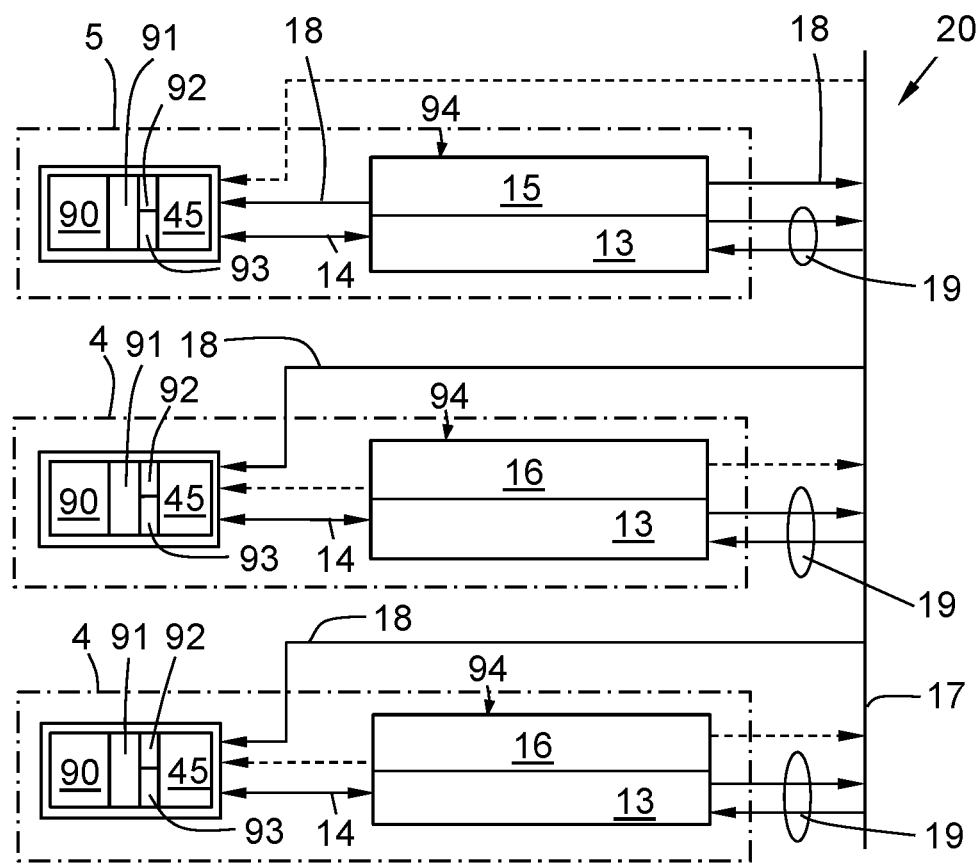
FIG. 2 shows a simplified representation of a bus system.

In FIG. 2, a simplified bus diagram 20 is shown, with a communications bus 17 to which several smart devices 4, 5 are connected, including two linear drives 4, and a pivot drive 5. In addition to an electric motor 90, the drives 4, 5, 7 constitute a reduction gear 45, brakes 91, potentiometers 92, temperature sensors 93, and a controller 94. On the latter, software with system master control functions, or redundant system control functions and device control functions (basic functions), are installed. In the present example, the pivot drive 5, in addition to its basic function, also has a system master function. The pivot drive 5 has an active system master controller 15, and each linear drive 4 has a redundant system controller 16, which is inactive in normal operation. In addition, pivot drive 5 and linear drives 4 have a device control 13, which control electric motors 90 and brakes 91 of the devices 4, 5 directly via device control commands 14, and output position signals from the potentiometers 92 and temperature signals from the temperature sensors 93 as status information to the communications bus 17. The pivot actuator 5 (with system master function) receives the status information 19 from the remaining bus participants, processes this and equivalent information of the own device control 13, and sends control commands 18 to the communications bus 17.

Of the remaining bus participants, the control commands 18 of the system master controller 15 are executed with higher priority than the device control commands 14 of the respective local device control 13. The redundant system controllers 16 have a predefined ranking and become active in case of failure of the device with the active system master function, and the highest ranking of the redundant system controllers 16 takes over its control tasks. Depending upon the type of fault, an emergency program can also be run. The smart devices of a seat 2 which have a drive function together form a functional group, wherein the highest-ranking device according to definition exercises a sub-master function with respect to the overall system comprising several seats 2. Each seat 2, and thus each port 21, 22, 23, 24, is associated with a device with a sub-master function. The dashed lines are intended to indicate that the functions of the drive control can also change in case of failure of a drive 4, 5, 7 or a control function.

Figure 3:
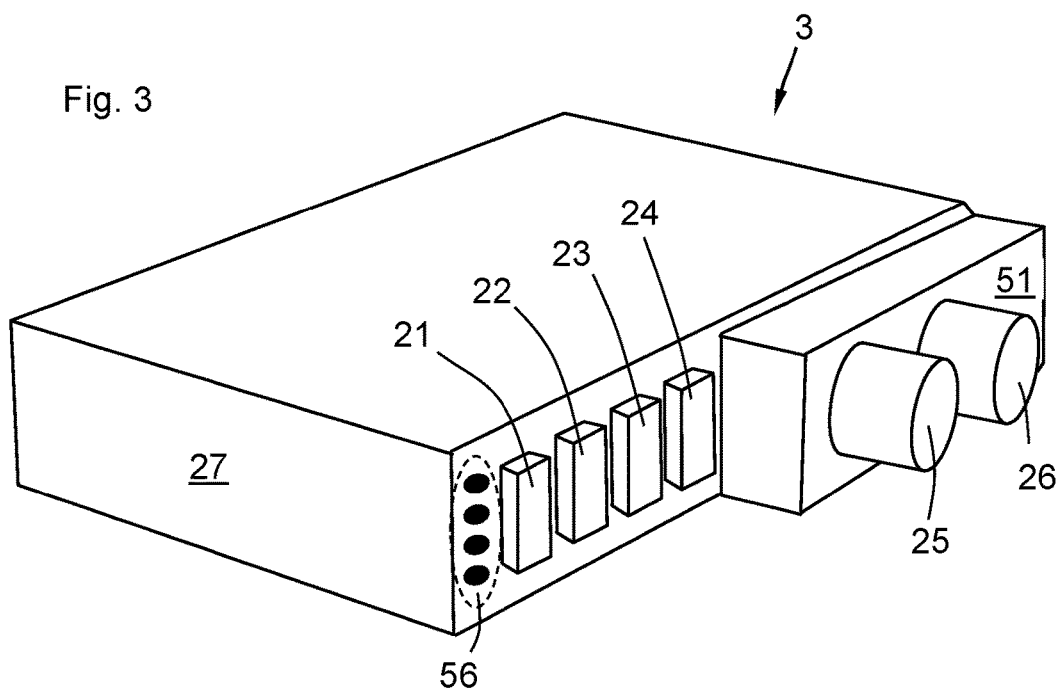
FIG. 3 shows a perspective view of a power supply.

FIG. 3 shows a simplified perspective illustration of a power supply 3, with a power supply housing 27, an input box housing 51, an on-board input 25, an electrical system outlet 26, a first port 21, a second port 22, a third port 23, and a fourth part 24. Ports 21 through 24 are DC outputs and have multiple connection pins. LED's 56 indicate whether power is applied to ports 21-24. The connection pins are occupied by an ID signal, which indicates to the connected smart devices the port 21, 22, 23, or 24 to which they are connected, and bus contacts which have no function in the power supply 3, but serve only for transmission. In addition, further optional connections are provided. The on-board electrical system connections also have several contacts, including ground contacts. The power supply 3 further includes short-circuit protection and filter components, and an overheating protection device.

Figure 4:
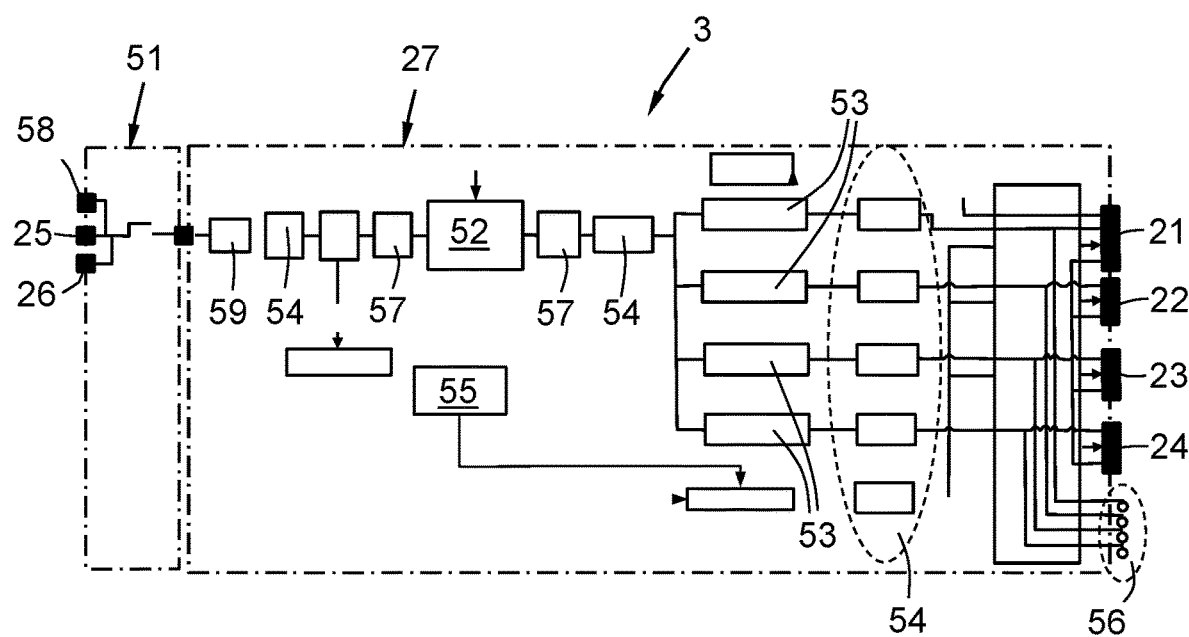
FIG. 4 shows a block diagram of the power supply of FIG. 3.

FIG. 4 shows a simplified block diagram of the power supply 3 with the input box housing 51, the power supply housing 27, the on-board input 25, the on-board electrical system outlet 26, a ground contact 58, the first port 21, the second port 22, the third port 23, and the fourth port 24. Between the on-board electrical system input 25 and the ports 21 through 24 are: a DC/DC converter 52, reversible short-circuit protection circuits 53, filters 54, a fuse 59, a temperature measuring device 55, capacitors 57, and the LED's 56. The power supply 3 also provides an ID signal to each port, to indicate to the connected smart devices which port they are connected to. Further, a DC enable circuit may be provided, to perform an emergency shutdown via a micro-switch.

Figure 5:
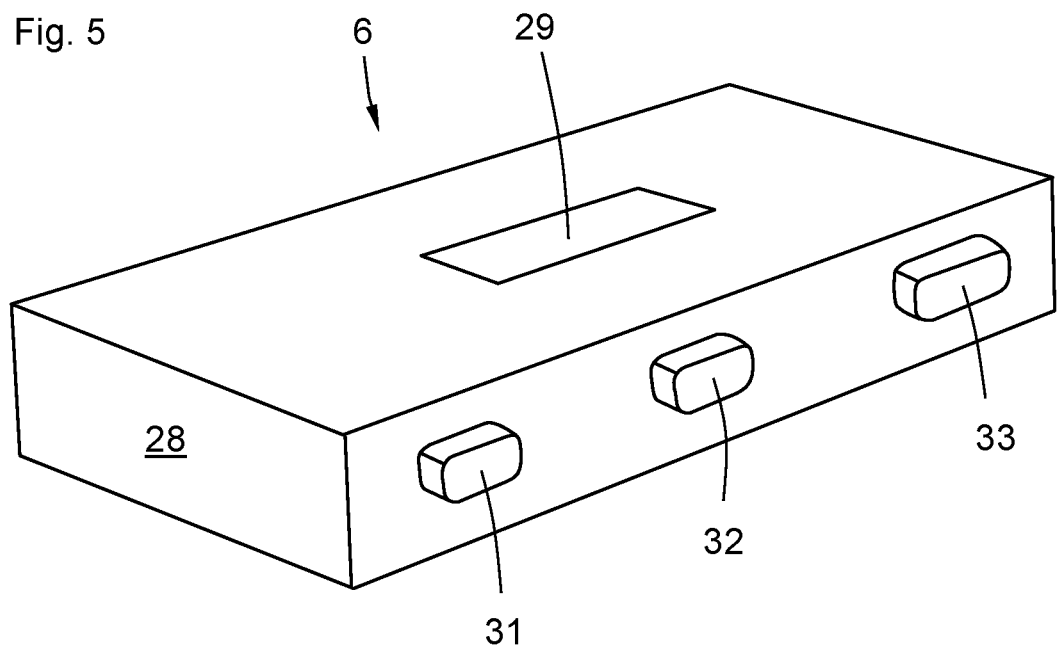
FIG. 5 shows a perspective view of a smart interface device (SID)

FIG. 5 shows a perspective view of a smart interface device (SID) 6, consisting of an SID housing 28, a display 29, a SID BUS input 31, a SID BUS output 32, and a SID interface 33.

Figure 6:
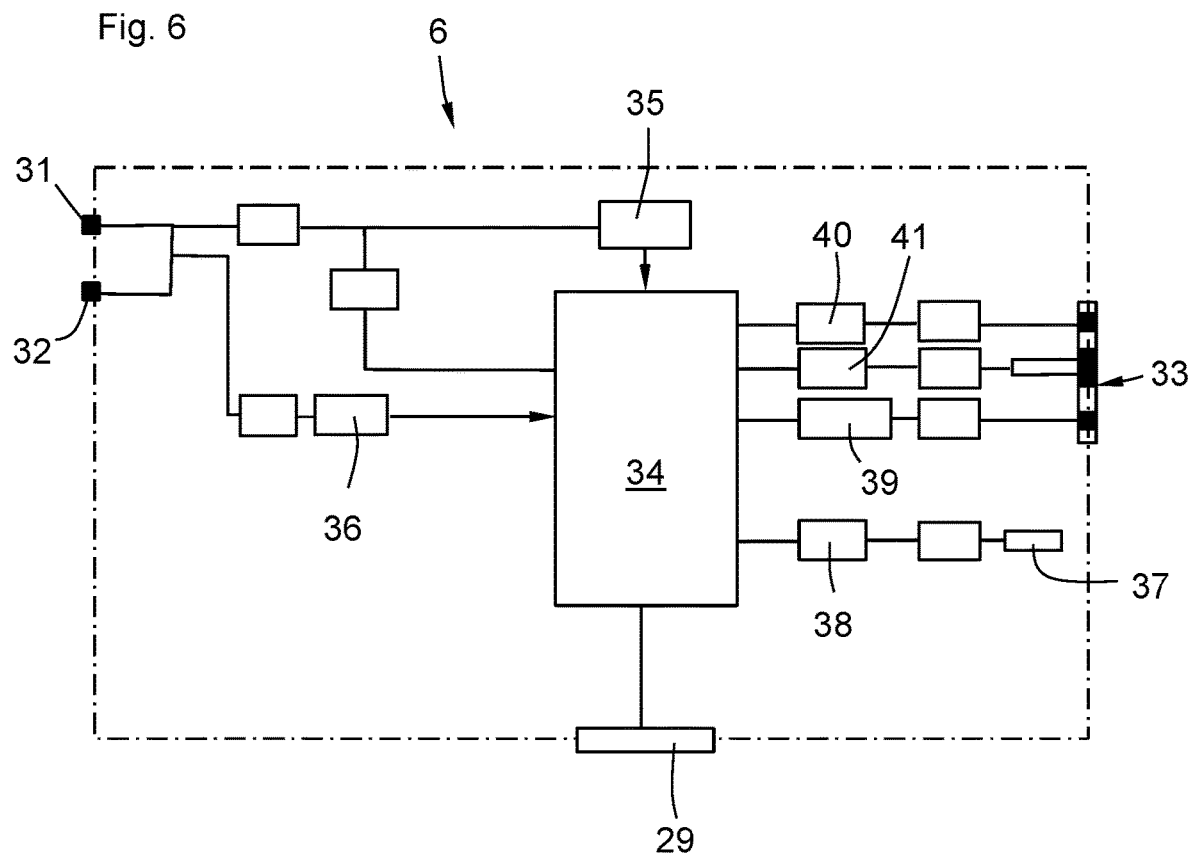
FIG. 6 shows a block diagram of the smart interface device (SID) of FIG. 5.

FIG. 6 shows a block diagram of the smart interface device (SID) 6, with the SID BUS input 31, the SID BUS output 32, a CAN BUS transceiver 36, a microcontroller board 34, the display 29, an input voltage measurement 35, an RS 232 transceiver 40, an RS 485 transceiver 41, an Ethernet transceiver 38, an RJ 45 diagnostic interface 37, a SID interface 33, and a USB power control 39. The microcontroller board 34 receives the BUS data, including the voltage signal defining the port interface of the power supply unit 3, processes the data, and outputs the results to the various interfaces and the display 29. The smart interface device (SID) 6 has no influence on the functionality of the drives, the lighting, etc.; it is used, in particular, as a data logger, for data analysis, for software installation via USB stick, and for maintenance.

Figure 7:
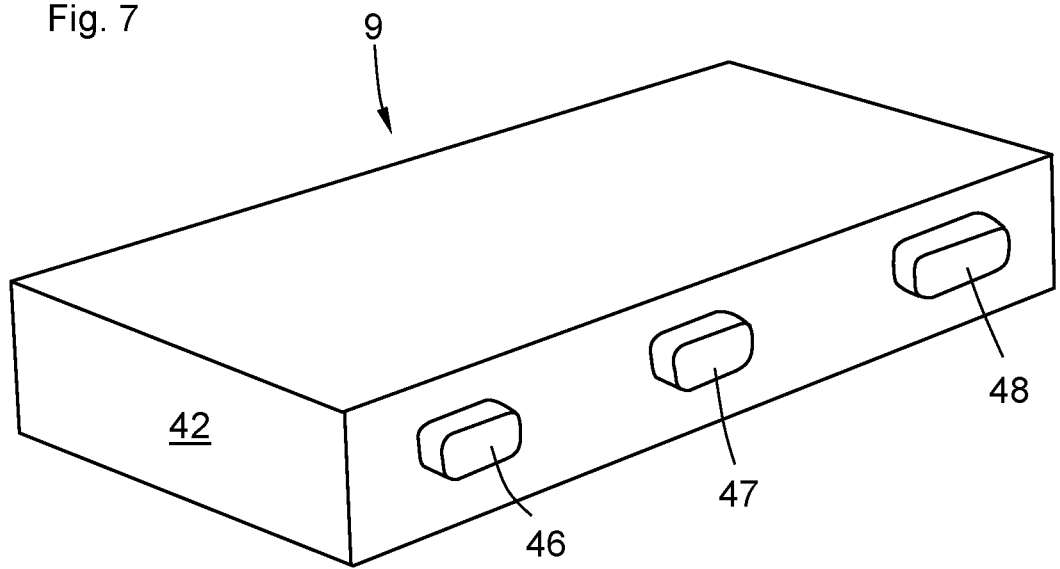
FIG. 7 shows a perspective view of a smart control device (DLC)

FIG. 7 shows a perspective view of a smart control device (DLC) 9, with a DLC housing 42, a DSL BUS input 46, a DSL BUS output 47, and power outputs. The power outputs are bundled by a DLC connector 48. Via a wire harness 81 (FIG. 13), the various additional functions, which do not have any individual intelligence, are connected to the DLC connector 48 and are thereby supplied with their individual voltage.

Figure 8:
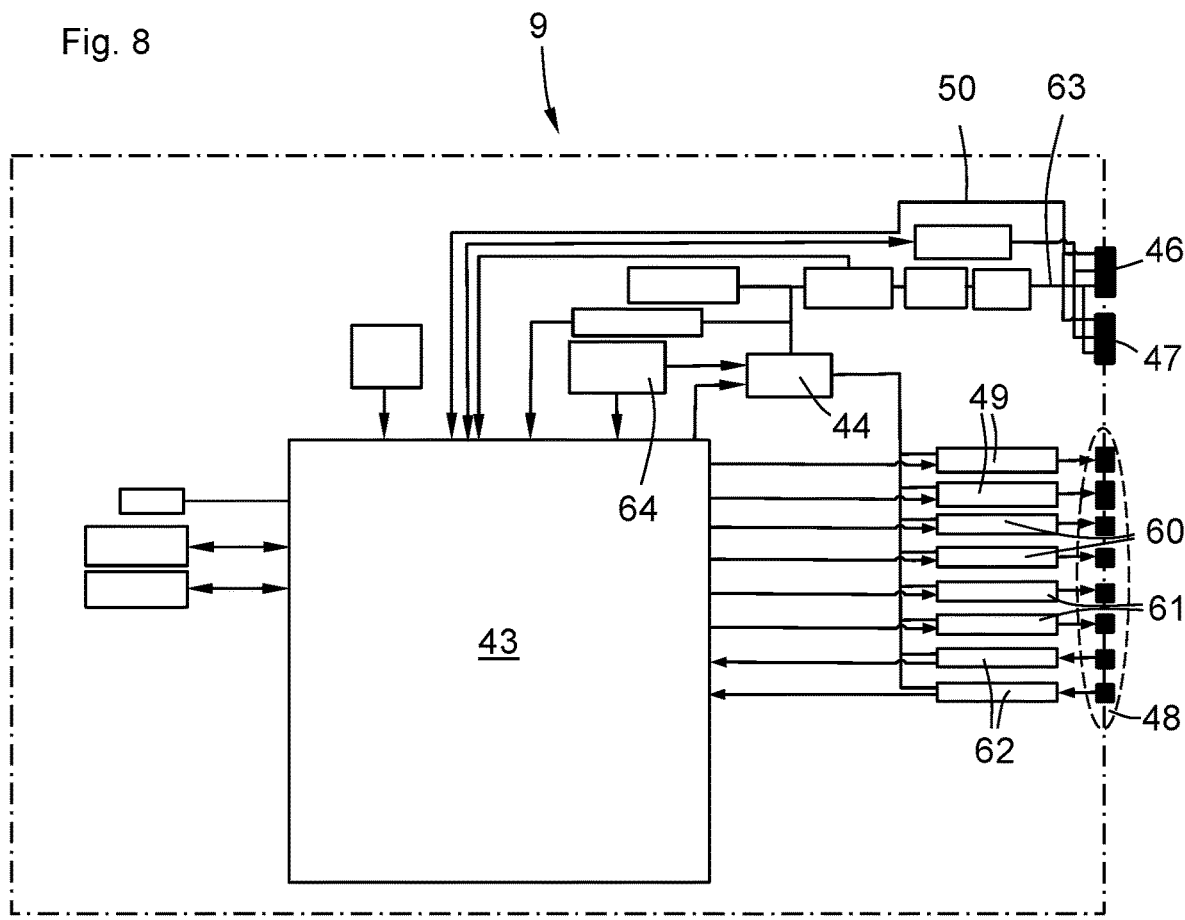
FIG. 8 shows a block diagram of the smart controller (DLC) of FIG. 7.

FIG. 8 shows a simplified block diagram of the smart control device (DLC) 9 with a DLC microcontroller 43, a power on/off switch 44, display lamp outputs 49, 12 V outputs 60, a DLC bus output 47, a DLC connector 48, 24 V outputs 61, and inputs 62. From the DLC BUS input 46, a 28 V line 63 leads to the power on/off switch 44, which is controlled by the DLC microcontroller 43 and a temperature comparison circuit 64. From the DLC BUS input 46, the DLC microcontroller receives an ID signal 50, via which the associated seat 2 is detected.

Figure 9:
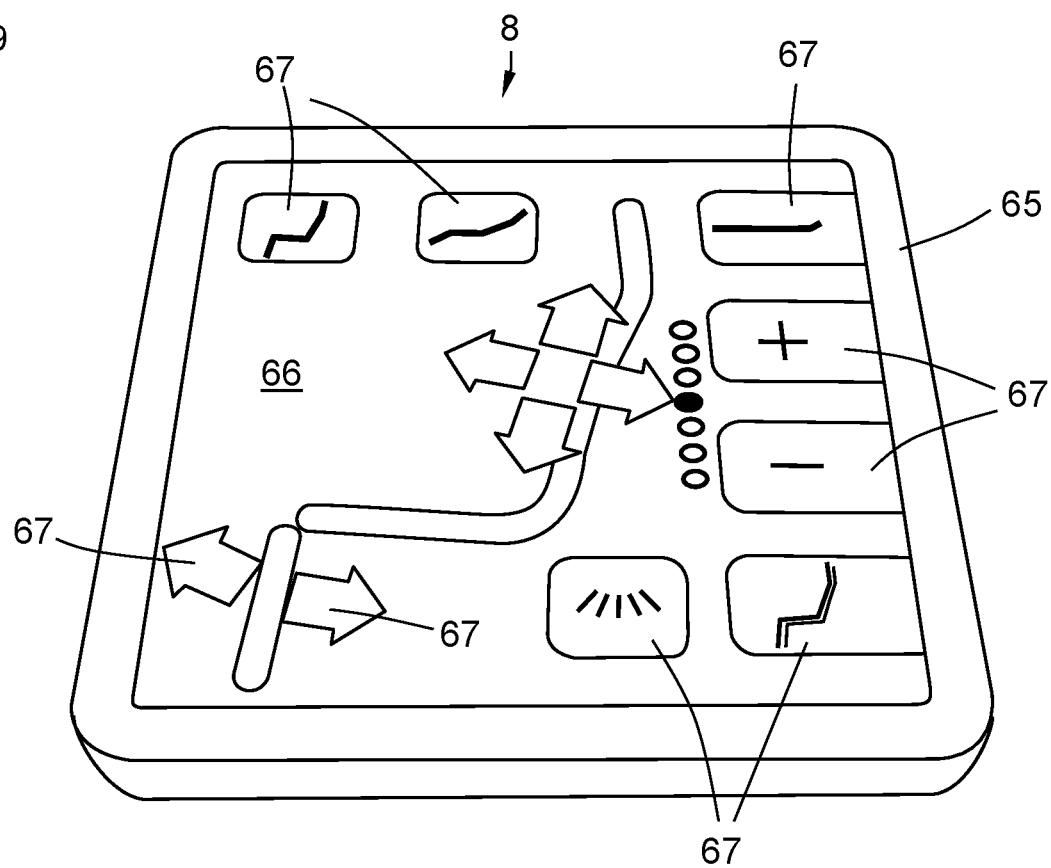
FIG. 9 shows a perspective view of a control unit (PCU)

FIG. 9 shows a perspective view of an example of a program control unit (PCU) 8 for controlling seat drives, lighting, etc., consisting of a PCU housing frame 65 made of aluminum, and a glass control panel 66, made of tempered safety glass, which has several capacitive sensitive areas which serve as panels 67 for different functions.

Figure 10:
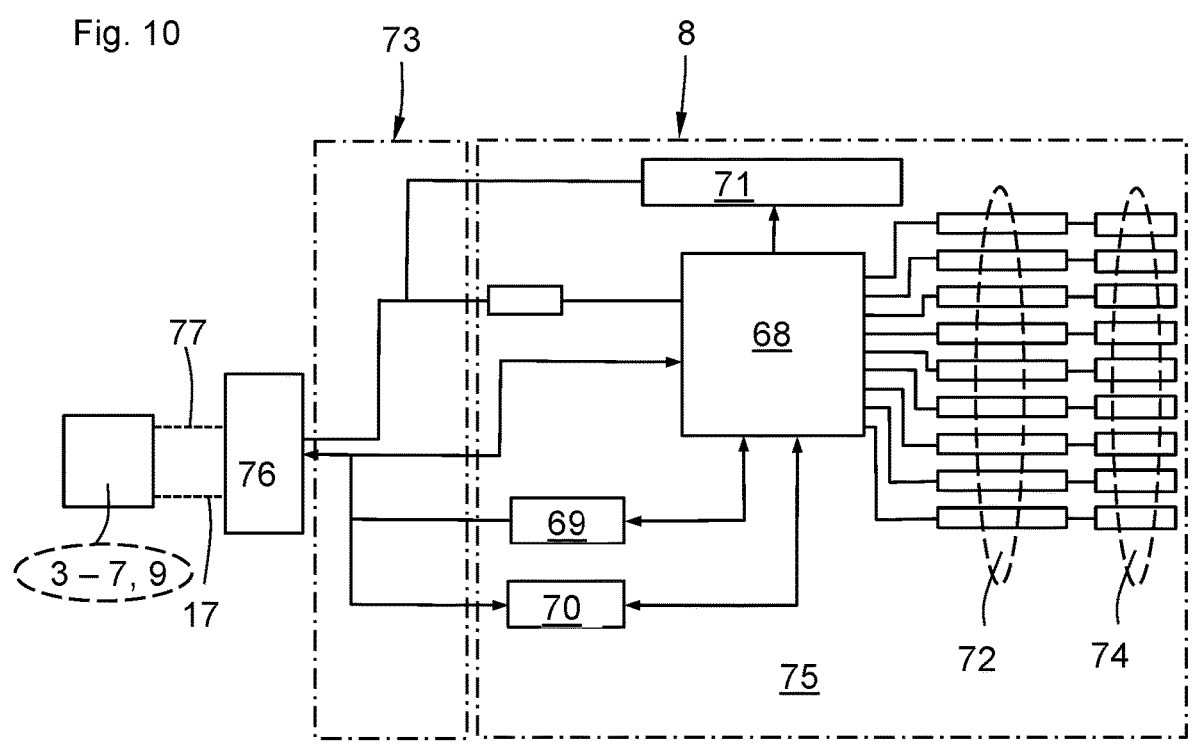
FIG. 10 shows a block diagram of the control unit (PCU) of FIG. 9.

FIG. 10 shows a simplified block diagram of the program control unit (PCUY) 8 from FIG. 9, with a PCU microcontroller 68, a PCU-RS 232 transceiver 69, a PCU-CAN transceiver 70, an LED backlight 71, and a plurality of program control panel elements 72. The microcontroller 68 serves to evaluate signals generated by the control panels 67 and the program control panel elements 72, and to generate therefrom control commands for the smart devices—in particular, for the drives and the lighting—which can be forwarded via the communications bus 17. The microcontroller 68, the LED backlight 71, the capacitive sensors 74, and the transceivers 69, 70 are mounted on a common PCU board 75. The program control unit (PCU) 8 is mounted on a back plate 73, which, via a PCU connector 76, connects to the communications bus 17 and to power supply lines 77, which are connected to other smart devices 4 through 9 and the power supply 3.

Figure 11:
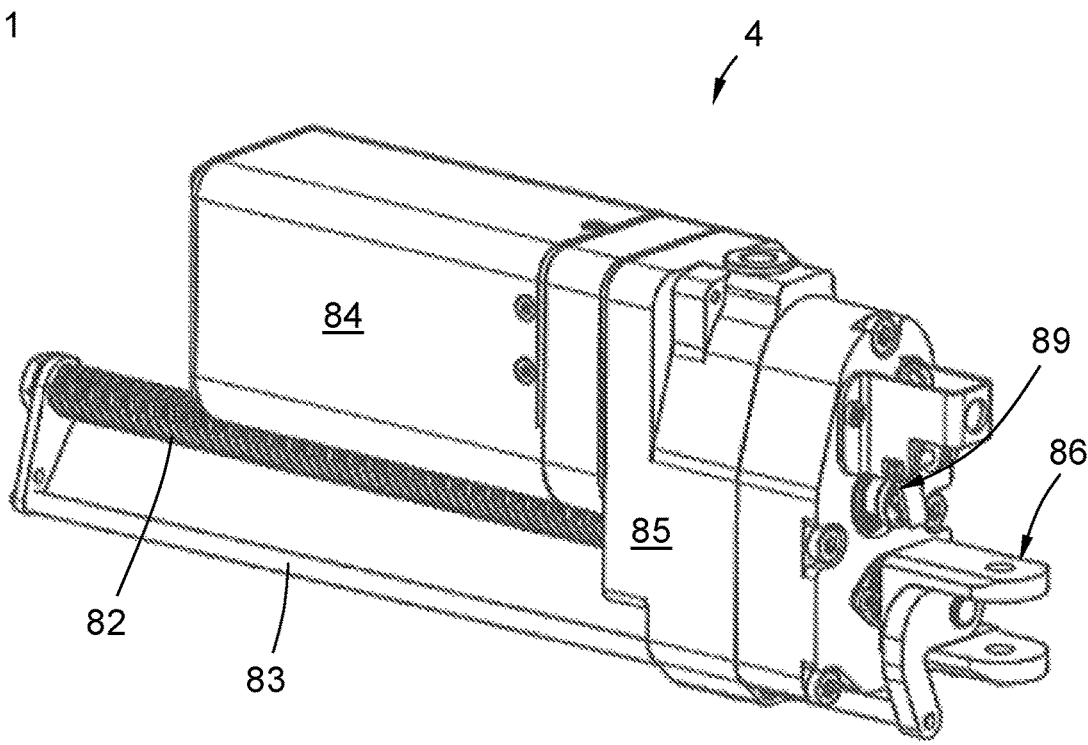
FIG. 11 shows a perspective view of a linear drive.

FIG. 11 shows a linear drive 4 with a motor housing 84 accommodating an electronically commutated DC motor, a gear unit casing 85 accommodating a reduction gear 45, a spindle 82, a guide rod 83 fixedly connected to the spindle 82, and an adjusting element 86 which is articulatably connectable with a seat element. The spindle 82 passes through the gear unit casing 85 and cooperates with a spindle nut (not shown) drivable by the gear unit. Inside the motor housing 84 is a printed circuit board with motion controller and low-speed BUS connection. Control functions of the motion controller include closed-loop speed control electronically commutated DC motor sine control, absolute position control, an anti-trap function through di/dt monitoring, temperature management, a self-monitoring function (BITE function), EMI filter functions, and an overvoltage/overcurrent protection. The linear drive 4 further comprises an active power-off brake for blocking the drive against external loads. In addition, the linear drive 4 comprises a release clutch 89 which can be operated in the event of a malfunction via a release lever and a Bowden cable.

Figure 12:
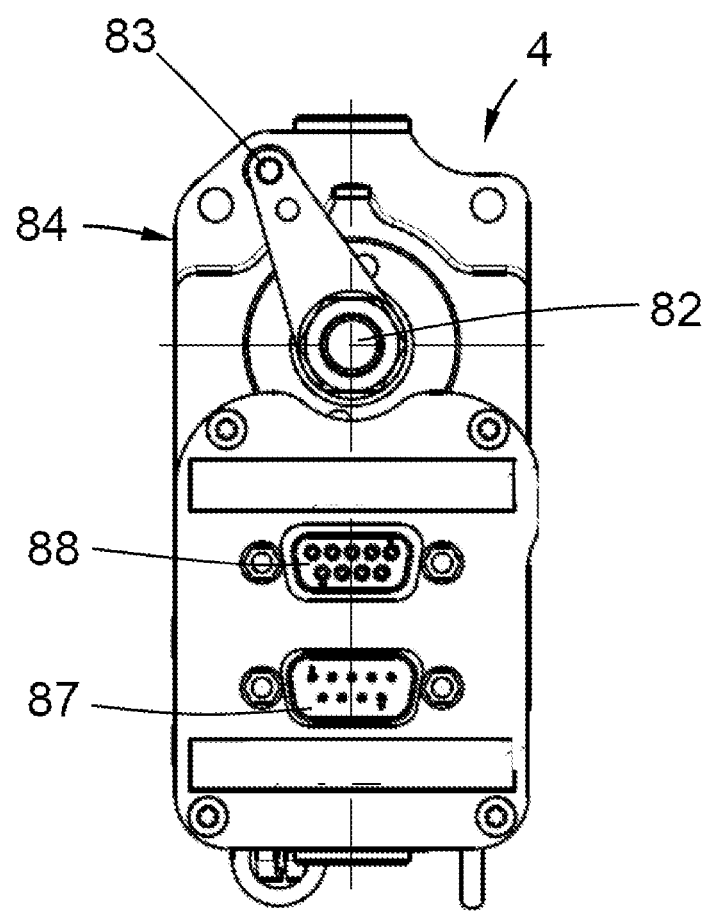
FIG. 12 shows an end view of the linear drive of FIG. 11.

FIG. 12 shows a end view of the linear drive 4, with the spindle 82, the guide rod 83, the motor housing 84, a drive BUS input 87, and a drive BUS output 88, which are designed as male and female plug connections via which both the electrical power supply and the data transmission take place. Due to the serial BUS architecture, further drives can be easily integrated into the system via a daisy-chain connection.

Figure 13:
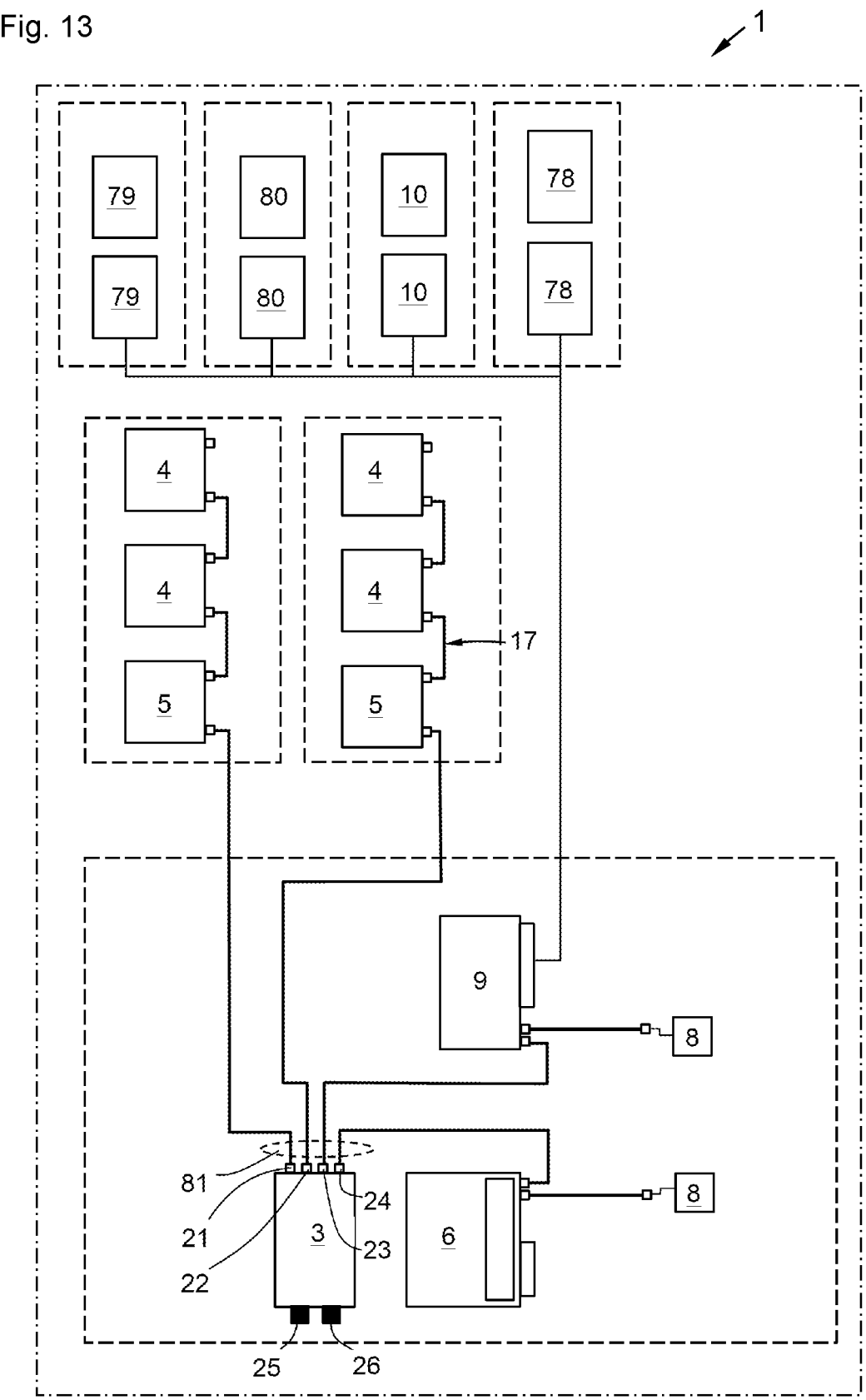
FIG. 13 shows a block diagram of an example of an interconnected seat control system according to the invention.

FIG. 13 shows an example of an interconnected seat control system 1, comprising a power supply 3, a smart interface device (SID) 6, a first program control unit (PCU) 8 for a first seat 2 and a second program control unit (PCU) 8 for a second seat 2, a smart control device (DLC) 9, linear drives 4, pivot drives 5, TTL indicator light 78, reading light (10), lock sensors 79, and locks 80. The drives 4, 5 at the ports 21 and 22, the smart interface device (SID) 6 at port 24, and the smart control device (DLC) 9 at the port 23 of the power supply 3 are connected via a cable harness 81. The drives are interconnected via daisy-chain-cabling. In this example, a program control unit (PCU) 8 is connected to the interface device (SID) 6, and the second program control unit (PCU) 8 is connected to the smart control device (DLC) 9. The latter also establishes a connection with lock sensors 79, locks 80, and a TTL indicator lamp. The TTL indicator lamp 78 indicates whether the respective seat has reached the TTL position (landing position). The lock sensor 79 detects whether the passenger has put on his seat belt or whether the seat 2 is locked. The power supply 3 has an on-board electrical system input 25 and an on-board electrical system output 26. The two associated seats 2 form a seating group, for each of which only one power supply 3, one interface device (SID) 6, and one smart control device (DLC) 9 are required.

If more than two seats 2 are to be driven and controlled, the two ports 23 and 24 are connected to the respective drives of the additional seats 2. The smart interface device (SID) 6 and the smart control device (DLC) 9 are in this case, for example, connected to a free BUS port of one of the drives, or SID 6 and DLC 9 are connected between power supply 3 and drives in a daisy-chain. Likewise, the program control unit (PCU) 8 may be connected to almost any point on the communications bus 17. The arrangement depends more upon the cabling and mobility of the drives connected to the BUS cables.

Figure 14:
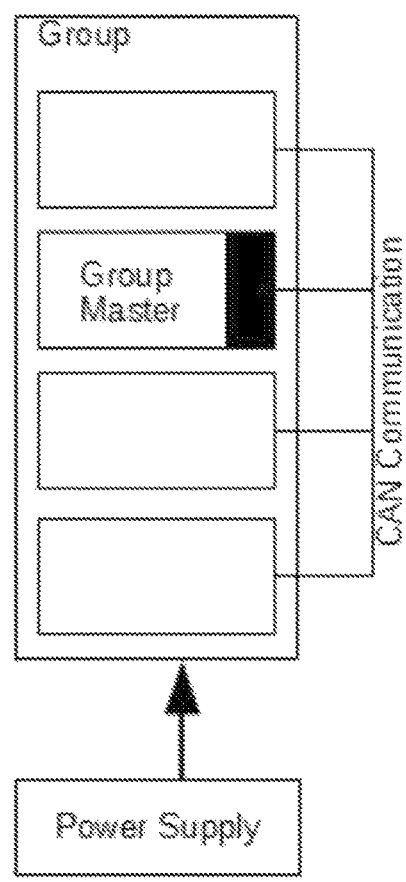
FIG. 14 shows a block diagram of a group of bus participants.

FIG. 14 shows a block diagram of a group of devices which communicate with one another via a CAN bus, wherein the group of one of the devices exercises the function of a group master in addition to its basic function.

Figure 15:
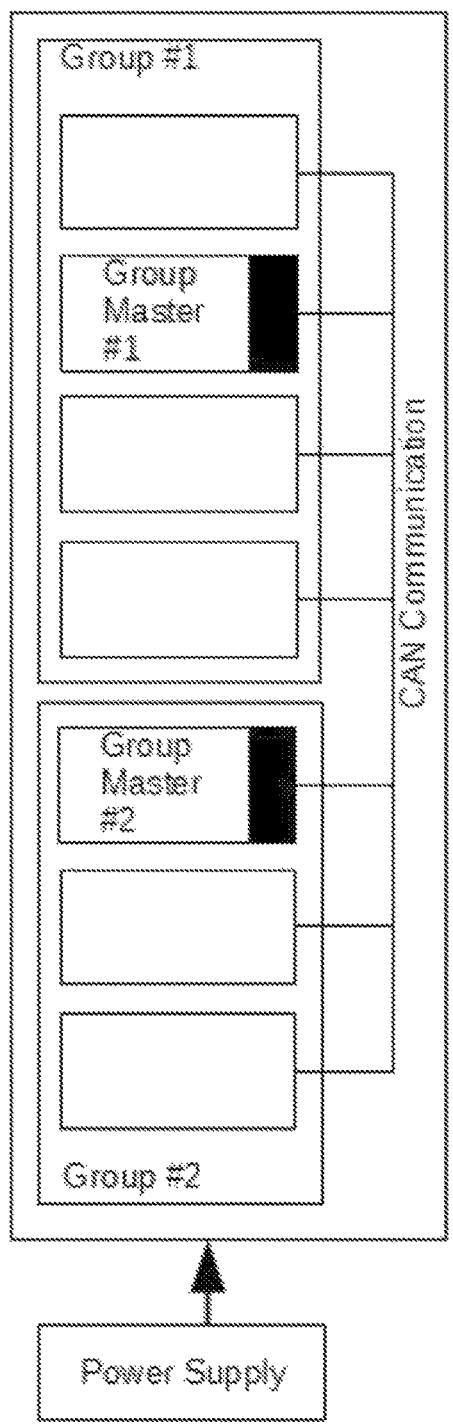
FIG. 15 shows a block diagram of two groups of bus participants.

FIG. 15 shows a block diagram of two groups of devices connected to the same CAN-BUS, but each having a group master within its group. The two groups consist of a different number of devices, and a different device type, respectively, is defined as group master. Here, too, the respective group master additionally performs a basic function. In this way, the tasks of the system master are distributed over several smart devices, each of which is responsible for subtasks. The master functions can be determined by the respective group master or by other devices with master function.

It is to be understood that the present invention is not limited to the illustrated embodiments described herein. Various types and styles of user interfaces may be used in accordance with the present invention without limitation. Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

LIST OF REFERENCE NUMBERS

| | |
|---|---|
| 1 | Seat control system |
| 2 | Seat |
| 3 | Power supply |
| 4 | Linear drive |
| 5 | Pivot drive |
| 6 | Interface device (SID) |
| 7 | Lumbar drive |
| 8 | Control unit (PCU) |
| 9 | Control device (DLC) |
| 10 | Reading light |
| 11 | Mood lighting |
| 12 | Custom lighting |
| 13 | Device control |
| 14 | Device control command |
| 15 | System master control |
| 16 | Redundant system control |
| 17 | Communications bus |
| 18 | Control command |
| 19 | Status information |
| 20 | Bus circuit plan |
| 21 | First port |
| 22 | Second port |
| 23 | Third port |
| 24 | Fourth port |
| 25 | On-board electrical system input |
| 26 | On-board electrical system output |
| 27 | Power supply housing |
| 28 | SID housing |
| 29 | Display |
| 31 | SID-BUS input |
| 32 | SID BUS output |
| 33 | SID interface |
| 34 | Microcontroller board |
| 35 | Input voltage measurement |
| 36 | CAN BUS transceiver |
| 37 | RJ 45 diagnostic interface |
| 38 | Ethernet transceiver |
| 39 | USB power control |
| 40 | RS 232 transceiver |
| 41 | RS 485 transceiver |
| 42 | DLC housing |
| 43 | DLC microcontroller |
| 44 | Power on/off switch |
| 45 | Reduction gear |
| 46 | DLC BUS input |
| 47 | DLC BUS output |

-continued

LIST OF REFERENCE NUMBERS

| | |
|---|---|
| 48 | DLC connector |
| 49 | Indicator light output |
| 50 | ID signal |
| 51 | Input box housing |
| 52 | DC/DC converter |
| 53 | Short circuit protection circuit |
| 54 | Filter |
| 55 | Temperature measuring device |
| 56 | LED |
| 57 | Capacitor |
| 58 | Ground contact |
| 59 | Fuse |
| 60 | 12 V output |
| 61 | 24 V output |
| 62 | Input |
| 63 | 28 V line |
| 64 | Temperature comparison circuit |
| 65 | PCU housing frame |
| 66 | Glass panel |
| 67 | Control panel |
| 68 | PCU microcontroller |
| 69 | PCU-RS 232 transceiver |
| 70 | PCU-CAN transceiver |
| 71 | LED backlight |
| 72 | Control panel element |
| 73 | Backplate |
| 74 | Capacitive sensor |
| 75 | PCU board |
| 76 | PCU connector |
| 77 | Power supply line |
| 78 | TTL indicator light |
| 79 | Lock sensor |
| 80 | Lock |
| 81 | Wire harness |
| 82 | Spindle |
| 83 | Guide rod |
| 84 | Motor housing |
| 85 | Gear unit casing |
| 86 | Adjustment element |
| 87 | Drive BUS input |
| 88 | Drive BUS output |
| 89 | Release clutch |
| 90 | Electric motor |
| 91 | Brake |
| 92 | Potentiometer |
| 93 | Temperature sensor |
| 94 | Controller |

What is claimed is:

1. A decentralized seat control system for seats, each seat having several linearly or angularly movable seat elements, the control system comprising:
    a serial data bus;
    a power supply;
    smart devices with drives connected to the serial data bus and the power supply, each smart device having a basic function and selectably functioning as an active system master;
    non-smart devices, the non-smart devices lacking a control function;
    a smart control device which controls the non-smart devices, the non-smart devices being non-bus compatible; and
    a program control unit,
    wherein the active system master provides control commands to the other smart devices.

2. The decentralized seat control system according to claim 1, wherein the tasks of each system master are distributed to several of the smart devices, wherein each of the smart devices, in addition to its basic function, has at least one subtask of a partial system master.

3. The decentralized seat control system according to claim 2, wherein the subsystem masters form subgroups in relation to the overall functionality of the seat control system.

4. The decentralized seat control system according to claim 2, wherein at least one of the smart devices with a system master or subsystem master function receives status information from other of the remaining smart devices.

5. The decentralized seat control system according to claim 1, wherein one of the smart devices controls the drives of at least one seat and has the task of the motion coordination of the seating elements of a least one seat.

6. The decentralized seat control system according to claim 1, wherein a first one of the devices controls a portion of the drives of at least one seat, a second one of the devices controls another portion of at least one seat, and the second device has the task of motion coordination of the sub-seating elements of at least one seat.

7. The decentralized seat control system according to claim 1, wherein the non-smart devices include a reading light, a mood light, a custom lighting, a monitor, locks, external sensors for environmental detection, and/or an external control unit.

8. The decentralized seat control system according to claim 1, wherein the power supply forms an interface to a vehicle electrical system and converts the vehicle electrical system voltage.

9. The decentralized seat control system according to claim 8, wherein the power supply has one or more ports to which several of the seats and other devices can be connected.

10. The decentralized seat control system according to claim 8, wherein the different ports are equipped with a port identifier, which represents a recognition feature for the respective device to be controlled.

11. The decentralized seat control system according to claim 10, further comprising a communications bus, wherein several of the seats have identical devices and the identical devices are connected to the communications bus, and a distinction is executable via the port identifier.

12. The decentralized seat control system according to claim 11, wherein several groups are present consisting of the seats, partitions, or other devices, which is less than the absolute number of the drives.

13. The decentralized seat control system according to claim 12, wherein each seat or each of the several groups has an identifier, and the power supply has a splitter function by which several seats or devices can be controlled.

14. The decentralized seat control system according to claim 1, wherein each seat or functional group has an identifier, and a splitter function is integrated into a separate or different device of the seat control system, by which several seats or devices can be controlled.

15. The decentralized seat control system according to claim 1, further comprising a smart interface device which serves as a service interface via which software and/or parameter sets can be uploaded to all smart devices of the decentralized seat control system.

16. The decentralized seat control system according to claim 15, wherein the smart interface device collects and stores system data.

17. The decentralized seat control system according to claim 16, wherein the smart interface device manages a configuration with respect to other on-board systems in a vehicle.

18. The decentralized seat control system according to claim 1, further comprising a parameter set in all smart devices, wherein each parameter set defines the selection of the devices with system master or sub-system master function.

19. The decentralized seat control system according to claim 1, wherein failure of one of the smart devices results in another of the smart devices assuming a function or partial function of the one of the smart devices.

20. The decentralized seat control system according to claim 1, wherein the individual smart devices are daisy-chained together.

21. The decentralized seat control system according to claim 1, further comprising a communications bus, wherein the controller in each of the smart devices controls the device on the basis of status information from the communications bus.

22. The decentralized seat control system according to claim 1, wherein system tasks are performed on the basis of the command of at least one of the active system masters.

23. The decentralized seat control system according to claim 22, wherein the active system masters receive the status of the other smart devices of the system and send commands back to the smart devices.

24. The decentralized seat control system according to claim 1, wherein, in case of failure of a system master, another of the smart devices assumes the role of the failed system master.

25. The decentralized seat control system according to claim 1, wherein, in case of failure of one of the active system masters, one of the smart devices is selected according to a pre-installed priority list, and takes over the function of the failed active system master.

26. The decentralized seat control system according to claim 1, further comprising a smart interface device including a data storage medium and being capable of performing data analysis,
wherein the smart interface device has a sufficient, electronically captive memory of more than 1 GB, in which statistically relevant amounts of data are stored during operation.

27. The decentralized seat control system according to claim 26, wherein the stored data are automatically evaluated during operation, and failures are detected and reported.

28. The decentralized seat control system according to claim 1, wherein a real-time clock is provided which provides the exact time of an event.

29. The decentralized seat control system according to claim 28, wherein the power supply of the real-time clock takes place via a long-term energy storage device.

30. The decentralized seat control system according to claim 1, further comprising a smart interface device which logs data and wherein the logged data are assigned to a cabin interior pressure.

31. The decentralized seat control system according to claim 11, wherein the drives have an integrated motion control, which has interfaces to a motor, to a position feedback, to a temperature sensor, to a brake, and to the communications bus.

32. The decentralized seat control system according to claim 1, a motion control of the drives includes an anti-trap function provided via a di/dt monitoring.

33. The decentralized seat control system according to claim 1, wherein an anti-trap function is provided in a kinematic- and position-dependent manner.

34. The decentralized seat control system according to claim 1, wherein a load-independent speed control is integrated into the motion control.

35. The decentralized seat control system according to claim 1, wherein some of the drives comprise power-optimized, commutated BLDC motors.

36. The decentralized seat control system according to claim 35, wherein a movement start with a temporally increasing course of the frequency of the power-optimized commutation and a movement stop with a temporally decreasing course of the frequency of the power-optimized commutation takes place.

37. The decentralized seat control system according to claim 35, wherein the motor speed can be regulated up to a rotational speed of 0.

38. The decentralized seat control system according to claim 11, further comprising brakes, wherein the system master controls all of the other drives such that, during simultaneous control of several drives as a group via the communications bus, the activation and deactivation of the brakes takes place.

39. The decentralized seat control system according to claim 38, wherein, if, in case of deactivated brakes, individual of the drives reach their end point of movement before other of the drives that are subordinate to a system master, the drive control provides for a counter-control using a position control in the case of a force application of these drives, until, upon reaching the end point of movement by the last of the drives, the brakes for all affected drives are activated again.

* * * * *